United States Patent [19]

Vowell

[11] Patent Number: 4,707,323

[45] Date of Patent: Nov. 17, 1987

[54] DUCT CLOSURE

[75] Inventor: Kennison L. Vowell, Canoga Park, Calif.

[73] Assignee: Rockwell International Corporation, El Segundo, Calif.

[21] Appl. No.: 786,414

[22] Filed: Oct. 10, 1985

[51] Int. Cl.$^4$ ............................................. G21C 13/06
[52] U.S. Cl. ..................................... 376/203; 376/264; 138/89; 220/323
[58] Field of Search ....................... 376/203, 204, 264; 138/89; 166/192; 220/323

[56] References Cited

U.S. PATENT DOCUMENTS

| | | | |
|---|---|---|---|
| 3,672,403 | 6/1972 | Wilson | 138/89 |
| 3,698,592 | 10/1972 | Nelson | 220/323 |
| 4,425,944 | 1/1984 | Heuckelbach et al. | 138/89 |
| 4,470,946 | 9/1984 | Vassalotti et al. | 376/204 |
| 4,519,519 | 5/1985 | Meuschke et al. | 376/204 |

Primary Examiner—Deborah L. Kyle
Assistant Examiner—Richard L. Klein
Attorney, Agent, or Firm—H. Fredrick Hamann; Harry B. Field; Clark E. DeLarvin

[57] ABSTRACT

A closure for an inclined duct having an open upper end and defining downwardly extending passageway. The closure includes a cap for sealing engagement with the open upper end of the duct. Associated with the cap are an array of vertically aligned plug members, each of which has a cross-sectional area substantially conforming to the cross-sectional area of the passageway at least adjacent the upper end of the passageway. The plug members are interconnected in a manner to provide for free movement only in the plane in which the duct is inclined. The uppermost plug member is attached to the cap means and the cap means is in turn connected to a hoist means which is located directly over the open end of the duct.

13 Claims, 6 Drawing Figures

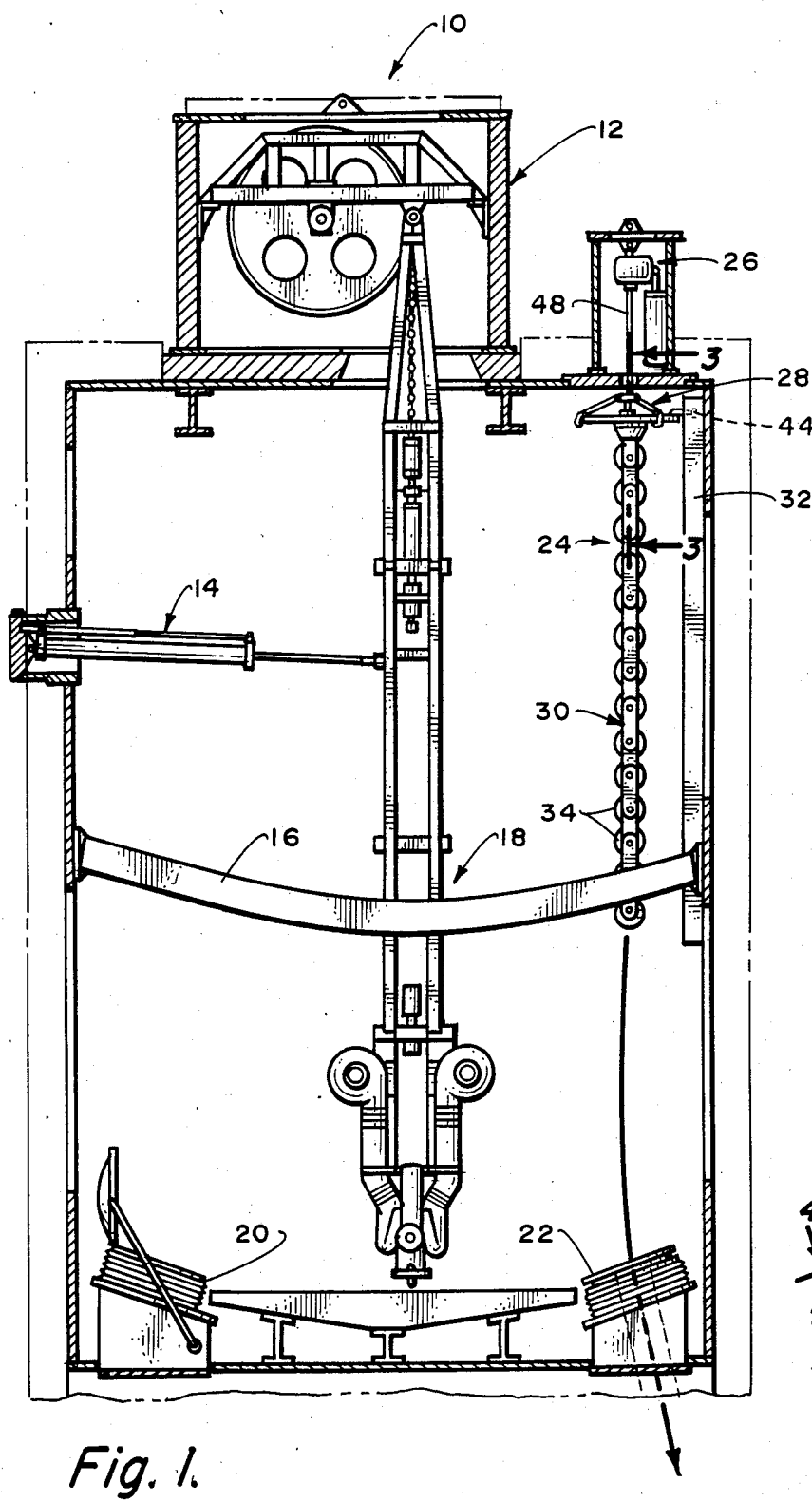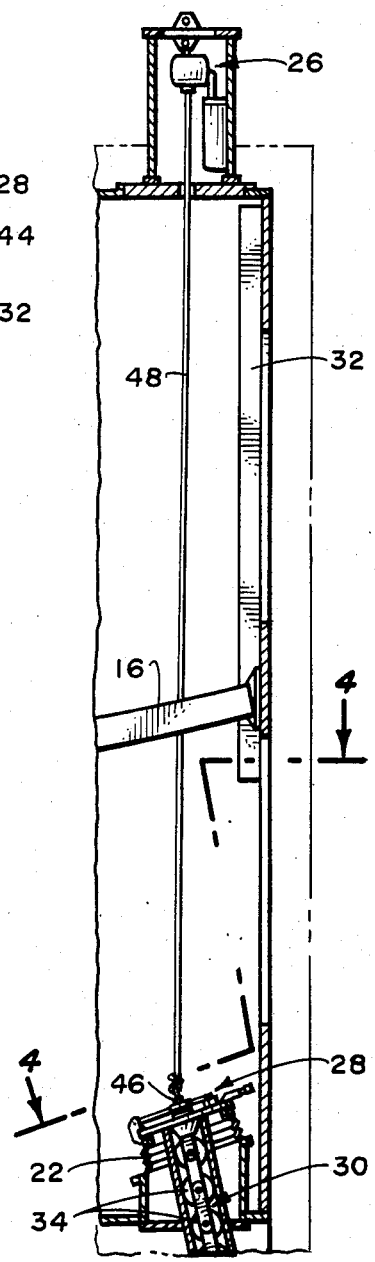
Fig. 1.
Fig. 2.

4,707,323

DUCT CLOSURE

STATEMENT OF GOVERNMENT INTEREST

The Government has rights in this invention pursuant to Contract (or Grant) No. DE-AC06-79ET37109 awarded by the U.S. Department of Energy.

BACKGROUND OF THE INVENTION

1. Field of the Invention

Broadly, the present invention provides a closure apparatus for an inclined duct. In a more specific embodiment of the invention there is provided a closure for such a duct which is utilized for the transfer of fuel elements into and out of a nuclear reactor vessel.

2. Description of the Prior Art

In a typical liquid metal cooled breeder reactor, two vessels are utilized. One vessel houses the reactor core and associated components. The other vessel is utilized for storage of fuel elements. Generally, each of the two vessels will be interconnected via inclined ducts to a fuel transfer cell which moves the fuel elements between the two vessels via the inclined ducts. The duct leading into the reactor-containing vessel is subject to extreme temperatures and radiation during normal operation of the reactor. Thus, the closure for that duct must provide for both thermal insulation and radiation absorption. To accomplish this result, the plug portion of the closure will generally have substantially the same configuration as the duct in cross-section and have sufficient length to achieve the required degree of thermal insulation and radiation absorption. The removal and insertion of such plugs requires a mechanism capable of tilting a sufficient amount to achieve axial alignment with the open end of the duct and must be sufficiently strong to support the plug while moving it axially in an inclined direction corresponding to that of the duct. Obviously, such a mechanism is necessarily bulky and complex. Accordingly, there is need for a closure for such a duct which could be raised and lowered in a vertical direction by a hoist to simplify its insertion and removal from the duct.

SUMMARY OF THE INVENTION

The present invention provides a simplified closure apparatus for an inclined duct having an open upper end and defining a downwardly extending passageway. The closure comprises a cap means for sealing engagement with the open upper end of the duct and further includes an array of vertically aligned plug members. Each of the plug members has a cross-sectional area substantially conforming to the cross-sectional area of the passageway at least adjacent and upper end thereof, and are freely moveable therein. Means are provided for interconnecting each of the vertically aligned plug members to provide for free movement of plug members only in the plane in which the duct is inclined. The uppermost plug of the array is connected to the cap means. A hoist is provided directly over the open upper end of the duct and connected to the cap means for moving the closure apparatus between an upper position at which the lowermost plug of the array is above the open end of the duct, and a lower position at which the cap means is in engagement with the open upper end of the duct.

In accordance with a preferred embodiment of the invention, the cap means further includes a latch for securing the cap to the open upper end of the duct. In accordance with another embodiment of the invention, each of the plug members comprises a cylinder, each cylinder having a longitudinally extending axle at each end. Axles of adjacent cylinders are interconnected by a plurality of end plates. Advantageously, the cylinders are rotatable to facilitate their movement into and out of the duct.

In accordance with a particularly preferred embodiment there also is provided means for guiding at least a lower portion of the array of vertically aligned plug members into the open upper end of the duct. Typically, the guide means will comprise a vertical member in fixed relation to the open end of the duct and the cap includes an alignment member in vertically slideable engagement with the vertical member.

It is an object of the invention to provide a simplified closure apparatus for inclined duct.

It is another object of the invention to provide a closure system suitable for an inclined fuel transfer duct leading into a nuclear reactor vessel.

Still another object of the invention is to provide a closure apparatus with a latch which will automatically secure a cap to a duct upon contact.

Another object of the invention is to provide a closure system for a fuel transfer duct which will minimize the release of radiation and thermal energy from the interior of the duct.

These and other objects of the invention will be more apparent from the drawings and the following detailed description thereof.

BRIEF DESCRIPTION OF THE DRAWINGS

FIG. 1 is a front elevation view of a fuel transfer cell incorporating the closure of the present invention;

FIG. 2 is a side view partially broken away of the transfer cell of FIG. 1;

DETAILED DESCRIPTION OF THE INVENTION

Figure 3:
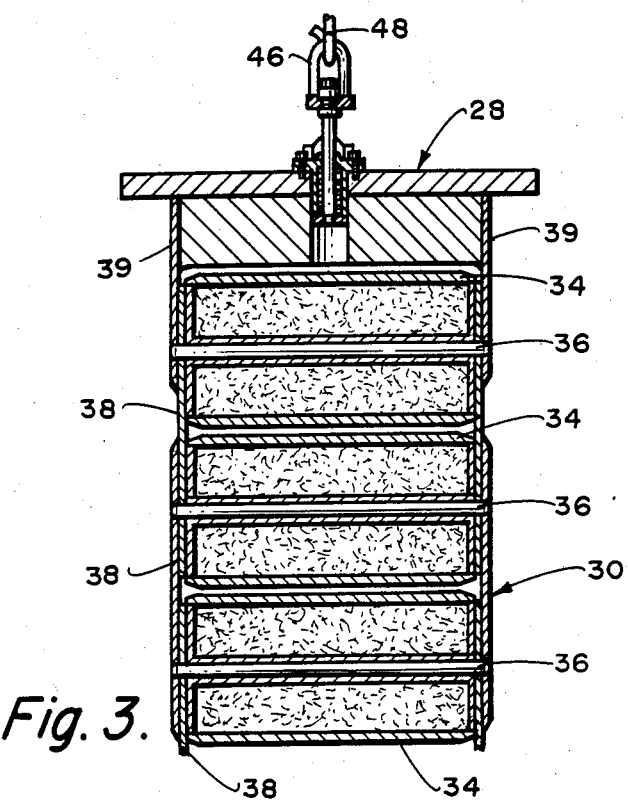
FIG. 3 is an enlarged view of a portion of the closure system of the invention taken along lines 3—3.

For convenience, the present invention will be described with respect to a particularly preferred application, namely, the closure of a fuel transfer duct leading into a liquid-metal cooled, breeder reactor. Referring to FIGS. 1 and 2 therein is depicted a typical fuel transfer cell 10 which includes a drive means 12, a piston actuator 14 and guide 16 for positioning a fuel transfer assembly 18. Piston actuator 14 and guide 16 provide for the positioning of transfer assembly 18 above and in axial alignment with ducts 20 and 22. Typically, duct 20 as shown would lead to a vessel for storage of fuel elements and duct 22 would lead to an internal portion of a nuclear reactor core containment vessel. Located vertically above duct 22 is a closure assembly 24 in accordance with the present invention. Broadly, closure assembly 24 comprises a hoist mechanism 26, a cap assembly 28, a vertical assembly of plug members 30 and a guide rail 32.

Referring to FIG. 3 it is seen that assembly 30 comprises a vertical array of cylinders 34. Each of cylinders 34 is provided with a longitudinally extending axle 36. Axles of adjacent cylinders are interconnected by a plurality of endplates 38 to provide for movement of the assembly in one plane but substantially inhibit movement at right angles to that plane, somewhat analogous to a bicycle chain. The uppermost cylinder is connected to cap assembly 28 by a plate member 39.

Figure 4:
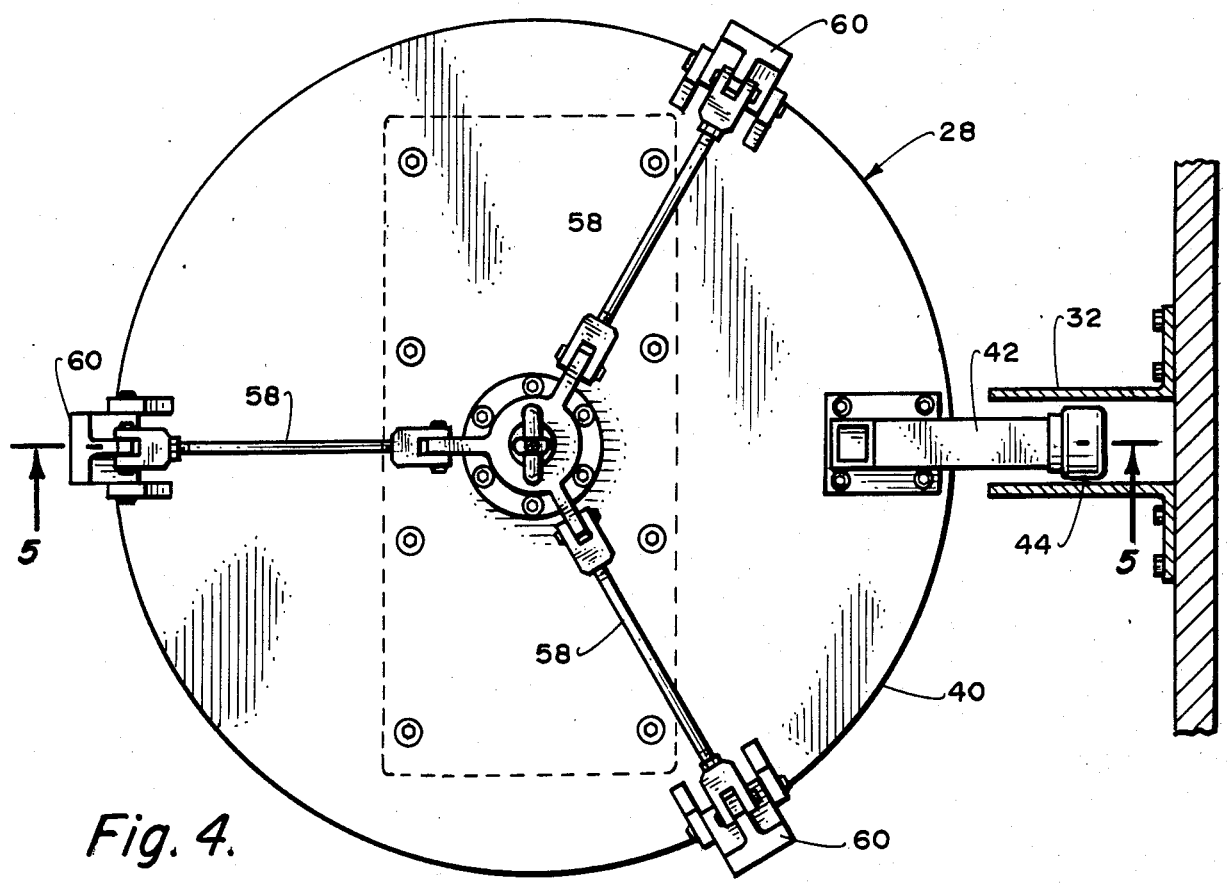
FIG. 4 is an enlarged plan view of the cap and guide means of the present invention taken along lines 4—4.
Figure 5:
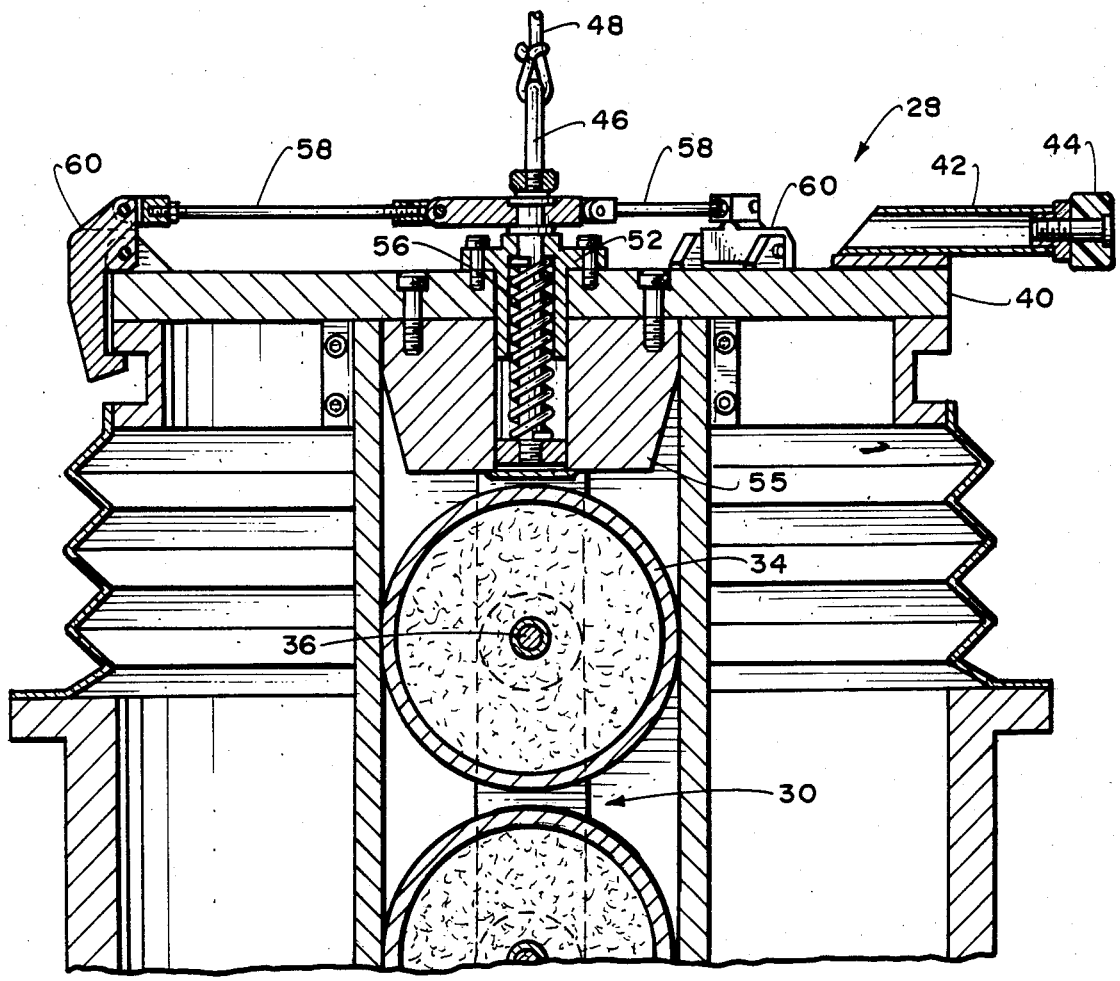
FIG. 5 is an enlarged sectional view taken along lines 5—5 of FIG. 4 showing the latching means engaged.
Figure 6:
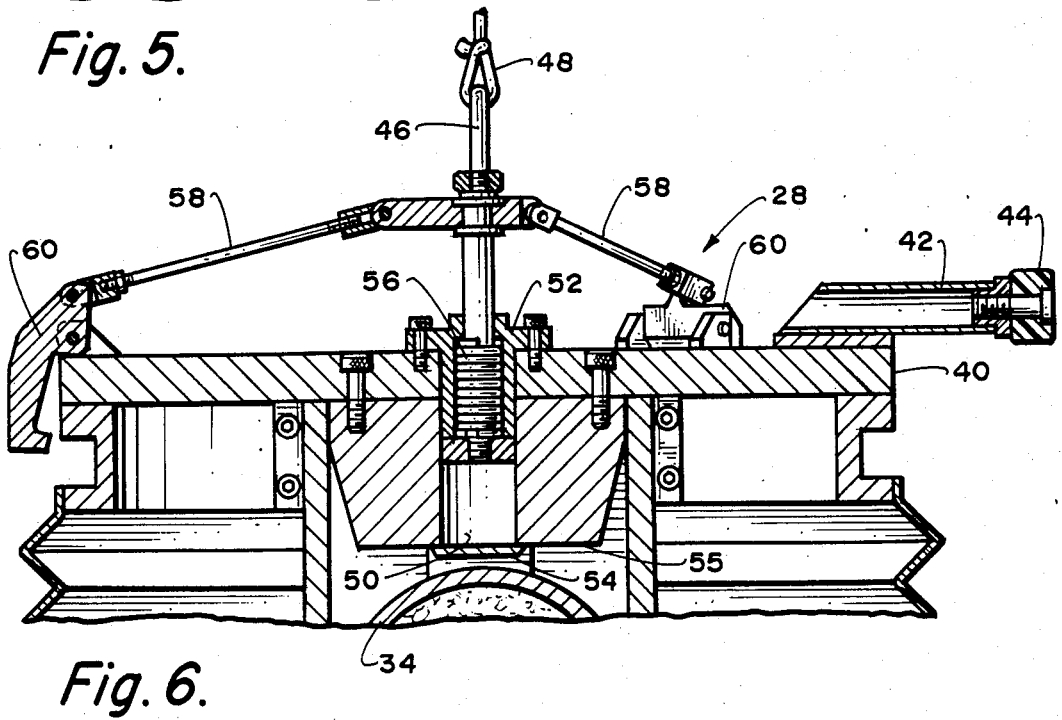
FIG. 6 is an enlarged sectional view taken along lines 5—5 of FIG. 4 showing the latch disengaged.

Referring now to FIGS. 4-6, the details of cap assembly 28 will be more apparent. Specifically, it is seen that cap assembly 28 comprises a base plate 40. Affixed to an upper surface of base plate 40 is a guide arm 42 terminating in a rotatable guide wheel 44 which extends into a U-shaped channel formed by vertical guide member 32. Cap assembly 28 is provided with a lifting rod 46 which is connected at its upper end to a flexible cable or chain 48 which is in turn connected to hoist assembly 26. Lifting rod 46 has a lower end axially moveable in a vertical direction within a cavity 50. Axial movement is limited by upper and lower plates 52 and 54 respectively. A biasing means, typically a spring 56, is provided for maintaining lifting rod 46 in a lower position when no lifting forces are provided by cable 48 (as shown in FIG. 5). A bottom surface of plate 40 of cap assembly 28 advantageously includes a positioning member 55 which has substantially the same shape as the passageway in duct 22. The cross sectional area adjacent the bottom surface of plate 40 is close to the same as that of the passageway in duct 22 and tapers downwardly to a lesser cross sectional area to facilitate last minute positioning of cap assembly 28. Cap assembly 28 further includes a latching mechanism comprising a plurality of latch control arms 58, each control arm has one end attached to lifting rod 46 and an opposite end connected to a pivotally mounted latching member 60.

The operation of the closure assembly of the present invention is initiated prior to or upon completion of a fuel transfer operation. Specifically, referring to FIGS. 1 and 2. The fuel transfer mechanism 18 is returned to a substantially neutral position. As depicted in FIG. 1, closure assembly 24 is in a raised position. The vertical array of plug members 30 is suspending directly above duct 22 by hoist mechanism 26. When it is time to close duct 22, hoist member 26 is actuated lowering assembly 30 in a vertical direction. As it decends, guide roller 44 moves vertically downward through the channel defined by vertical guide member 32. Vertical guide member 32 has a sufficient length such that guide roller 44 remains in vertical guiding alignment until the lowermost of cylinders 34 has entered the passageway defined by duct 22.

Referring to FIG. 3, it is seen that axles 36 and end plates 38 freely permit movement of plug members 30 in the plane in which duct 22 is inclined. In addition, since cylinders 34 are freely rotatable, they move readily into the passageway defined by duct 22. After guide roller 44 has left the bottom end of vertical guide member 32, at least two or more of cylinders 34 have entered the passageway in duct 22 and now act as guides for the remaining assembly of plug members.

As closure assembly 24 reaches its lowermost position, cap assembly 28 contacts the open end of duct 22 and is guided into position by positioning member 55. Referring to FIG. 6 as hoist assembly 26 continues to lower cap assembly 28 spring 56 retracts lifting rod 46 into cavity 50. This in turn extends latch control arms 58 causing pivotally mounted latching members 60 to close and lockingly engage the upper end of duct 22. In a similar manner when lifting forces are applied to the upper end of lifting rod 46, the sequence of operation is reversed.

The temperatures and nature of radiation to which the closure assembly 24 is exposed are such that typically cylinders 34 will be hollow and may be made from carbon steel since the principal radiation will be gamma ray. In some instances it may be advantageous to fill at least the lower portion, and in some instances, all of cylinders 34 with a material such as steel wool to enhance their thermal insulation capabilities.

Thus it is seen that the present invention provides a substantially less complex method of achieving a satisfactory closure of a duct leading to an area exposed to both radiation and high temperatures. In addition, the present invention provides a closure system for an inclined fuel transfer duct which will automatically latch and secure a cap to a duct as well as automatically retracting the latch when it is desired to remove the cap. The precise number of cylinders 34 utilized and the decision whether to fill them with any additional material or not will be a function of the temperatures to which they will be exposed and the intensity and type of radiation eminating through the duct. However, these matters are all well within the skill of those versed in the art.

Various modifications may be made to this closure system without departing from the true spirit and scope of the invention. For example for a duct with a round passageway spherical plugs could be utilized as well as other types of lifting and latching mechanisms. In addition other materials of construction could be utilized. Therefore, the foregoing description and drawings should be considered illustrative rather than limiting.

What is claimed and desired to be secured by Letters Patent of the United States is:

1. A closure for an inclined duct having an open upper end and defining a downwardly extending passageway comprising:
   cap means for sealing engagement with said open upper end of said duct;
   an array of vertically aligned plug members each having a cross-sectional area substantially conforming to the cross-sectional area of said passageway at least adjacent an upper end thereof and being freely movable therein, each of said plug members comprising a cylinder each cylinder having a longitudinally-extending axle at each end;
   means interconnecting each of said vertically aligned plug members, said means providing for free movement of said plug members only in the plane in which said duct is inclined, said means comprising a plurality of end plates interconnecting axles of adjacent cylinders;
   means connecting said cap means to the uppermost plug of said array and;
   hoist means located directly over the open upper end of said duct for moving said closure between an upper position at which said lowermost plug of said array is above the open upper end of said duct and a lower position at which said cap means is in engagement with the open upper end of said duct.

2. The closure of claim 1 further including latch means associated with said cap means for securing said cap means to the open upper end of said duct.

3. The closure of claim 2 wherein said latch means is attached to said cap means and connected to said hoist means for engaging said latch means when said cap means engages the open end of said duct and for releasing said latch means when said hoist means moves in an upward direction.

4. The closure of claim 1 further including means for guiding at least a lower portion of said array of vertically aligned plug members into the open upper end of said duct.

5. The closure of claim 4 wherein said guide means comprises a vertical member in fixed relation to said duct means and said cap means includes an alignment member in vertically slideable engagement with said vertical member.

6. The closure of claim 5 wherein said vertical member has a lower terminal end located above the open end of said duct.

7. The closure of claim 1 wherein said plug members adjacent a lower portion of said array comprise thermal insulators.

8. The closure of claim 1 wherein said duct is a fuel transfer duct in a nuclear reactor.

9. In a liquid-metal cooled fast breeder reactor, a closure for an inclined fuel transfer duct, said duct having an open upper end and defining a downwardly extending substantially rectangular passageway comprising:
   cap means for sealing engagement with said open upper end of said duct;
   an array of vertically aligned plug members each having a substantially rectangular cross-sectional area conforming to the cross-sectional area of the passageway, at least adjacent an upper end thereof and being freely movable therein, each of said plug members comprising a cylinder, each cylinder having a longitudinally extending axle at each end;
   means interconnecting each of said vertically aligned plug members, said means providing for free movement of said plug members only in the plane in which said duct is inclined, said means comprising a plurality of end plates interconnecting axles of adjacent cylinders;
   means connecting said cap means to the uppermost plug of said array;
   hoist means located directly over the upper end of said duct for moving said closure between an upper position at which said lowermost plug of said array is above the open upper end of said duct, and a lower position at which said cap means is in engagement with the open upper end of said duct; and
   means associated with said cap means for guiding at least a lower portion of said array of said vertically aligned plug members into the open upper end of said duct.

10. The closure of claim 9 further including latch means associated with said cap means for securing said cap means to the open end of said duct.

11. The closure of claim 10 wherein said guide means comprises a vertical member in fixed relation to said duct means and said cap means includes an alignment member in vertically slideable engagement with said vertical member.

12. The closure of claim 11 wherein said vertical member has a lower terminal end located at a higher elevation than the open end of said duct.

13. The closure of claim 12 wherein said latch means is attached to to said cap means and connected to said hoist means for engaging said latch means when said cap means engages the open end of said duct, and for releasing said latch means when said hoist means moves in an upward direction.

* * * * *